US009798788B1

United States Patent
Reiner et al.

(10) Patent No.: US 9,798,788 B1
(45) Date of Patent: Oct. 24, 2017

(54) HOLISTIC METHODOLOGY FOR BIG DATA ANALYTICS

(71) Applicant: EMC IP Holding Company LLC, Hopkinton, MA (US)

(72) Inventors: David Stephen Reiner, Lexington, MA (US); David I. Dietrich, Hopedale, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 441 days.

(21) Appl. No.: 13/832,412

(22) Filed: Mar. 15, 2013

Related U.S. Application Data

(63) Continuation-in-part of application No. 13/728,394, filed on Dec. 27, 2012, now Pat. No. 9,262,493.

(51) Int. Cl.
G06F 17/30 (2006.01)
(52) U.S. Cl.
CPC .............. *G06F 17/30563* (2013.01)
(58) Field of Classification Search
USPC ............... 707/608, 609, 687, 705, 790, 821
See application file for complete search history.

(56) References Cited

U.S. PATENT DOCUMENTS

| 8,510,425 B2* | 8/2013 | Bantz ................. G06Q 10/00 705/14.46 |
| 2002/0114523 A1* | 8/2002 | Filatov et al. ................ 382/229 |
| 2002/0198889 A1* | 12/2002 | Vishnubhotla ........ G06F 9/4881 |
| 2009/0037355 A1* | 2/2009 | Brave et al. .................... 706/45 |
| 2013/0007235 A1* | 1/2013 | Humphreys et al. ......... 709/223 |
| 2013/0139152 A1* | 5/2013 | Chang ................ G06F 9/45545 718/1 |
| 2014/0095690 A1* | 4/2014 | Saker et al. .................. 709/224 |

* cited by examiner

Primary Examiner — Sana Al Hashemi
(74) Attorney, Agent, or Firm — Ryan, Mason & Lewis, LLP

(57) ABSTRACT

Example embodiments of the present invention include a method, a system, and a computer program product for provisioning a computing system in accordance with an automated data analytics lifecycle. The method includes defining a holistic context of an analytics lifecycle for an analytic problem. One or more data sets for solving the analytic problem and at least a portion of original data in the one or more data sets may be conditioned to generate conditioned data. The method also includes selecting a model to analyze at least one of the original data and the conditioned data and executing the selected model on at least one of a portion of the original data and a portion of the conditioned data to confirm an adequacy of the selected model. Results of execution may be communicated to at least one entity for provisioning computing resources to implement the selected model.

24 Claims, 13 Drawing Sheets

HOLISTIC METHODOLOGY FOR BIG DATA ANALYTICS

RELATED APPLICATION

This Application is a Continuation-in-Part of U.S. patent application Ser. No. 13/728,394 filed on Dec. 27, 2012 entitled "DATA ANALYTICS LIFECYCLE PROCESSES," the content and teachings of which are hereby incorporated by reference in their entirety.

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The field relates to data analytics, and more particularly to techniques for automating a holistic analytic lifecycle and provisioning a computing system in accordance with the automated holistic analytic lifecycle.

BACKGROUND

Data analytics typically refers to the science that incorporates various disciplines including, but not limited to, data engineering, mathematics, statistics, computing, and domain-specific expertise. A data scientist thus is one who practices some or all aspects of data analytics in attempting to solve complex data problems.

Conventional data analytics solutions are becoming more and more limited due to the increasing sizes and varying structures of data sets that such solutions are applied against. Such limitations include the lack of ability to adequately estimate the cost of the data analytics solution, the inflexibility and lack of optimality of the solution once it is defined, and the difficulty of putting the solution into operation. These negative factors result in a computing system provisioned to implement the data analytics solution that is costly, that does not adequately handle the data it was intended to handle, that is not optimal, and that is not adequately or beneficially operationalized.

Accordingly, improved data analytics techniques are needed that enable business users and data scientists to develop and implement data analytics more easily and efficiently.

SUMMARY

Example embodiments of the present invention include a method, a system, and a computer program product for automating an analytic lifecycle and provisioning a computing system in accordance with the automated holistic analytic lifecycle. The method includes defining a holistic context of an analytic lifecycle for an analytic problem. One or more data sets for solving the analytic problem according to the analytic lifecycle under the holistic context may be determined and at least a portion of original data in the one or more data sets may be conditioned to generate conditioned data. The method also includes selecting a model to analyze at least one of the original data and the conditioned data and executing the selected model on at least one of a portion of the original data and a portion of the conditioned data to confirm an adequacy of the selected model. Results of execution of the selected model may be communicated to at least one entity for provisioning of one or more computing resources to implement the selected model.

BRIEF DESCRIPTION OF THE DRAWINGS

The above and further advantages of the present invention may be better under stood by referring to the following description taken into conjunction with the accompanying drawings in which.

DETAILED DESCRIPTION

Embodiments of the present invention will be described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

Further, as used herein, the term "provisioning" refers to the process(es) of generating and deploying one or more computing resources in a computing system, such as for example, in a cloud infrastructure environment, generating and deploying one or more virtual machines in a data center.

FIGS. 1A through 4 will be used to describe an exemplary holistic analytic lifecycle automation and provisioning system in which various holistic analytic methodologies described in the context of FIGS. 5 through 11 may be employed. Further details of this exemplary system can be found in the U.S. patent applications identified as Ser. No. 13/628,589 filed on Sep. 27, 2012 and entitled "Data Analytics Lifecycle Automation" and Ser. No. 13/728,394 filed on Dec. 27, 2012 and entitled "Data Analytics Lifecycle Processes," the disclosures of which are incorporated by reference herein in their entirety. However, it is to be understood that the methodologies of FIGS. 5 through 11 can be employed in holistic analytic systems other than the ones described in FIGS. 1A through 4.

Figure 1A:
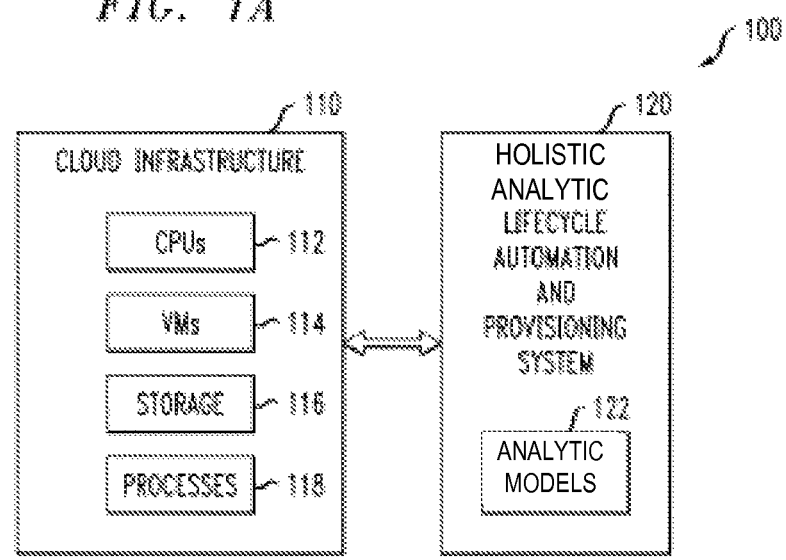
FIG. 1A illustrates cloud infrastructure and a holistic analytic lifecycle automation and provisioning system, in accordance with one embodiment of the invention.

FIG. 1A shows a system 100 configured in accordance with an illustrative embodiment of the present invention. The system 100 comprises cloud infrastructure 110 and a holistic analytic lifecycle automation and provisioning system 120.

As will be explained in detail below, the holistic analytic lifecycle automation and provisioning system 120 enables a data scientist to automatically, yet still interactively, create analytic models 122 that can be executed to solve one or more complex analytic problems. System 120 accomplishes this, as will be explained in detail below, by providing processing elements that embody phases of a holistic analytic lifecycle including, but not limited to, discovery, data preparation, model planning, model building, and operationalization of results.

Cloud infrastructure 110 is illustratively depicted in the figure as comprising an execution environment with execution components comprising one or more central processing units (CPUs) 112, one or more VMs 114, and storage devices 1166 (upon which logical units (LUNs) are implemented) that execute one or more processes 118 that operate on one or more process input data sets that generate one or more process output data sets. Thus, the analytic models 122 generated by system 120 can be operationalized using execution components (both physical and virtual computing resources) in the cloud infrastructure 110.

Although system elements 110 and 120 are shown as separate elements in FIG. 1A, these elements or portions thereof may be implemented at least in part on a common processing platform. In other embodiments, one or more of the system elements 110 and 120 may each be implemented on a separate processing platform, such as the processing platform to be described below in conjunction with FIG. 2. For example, the cloud infrastructure 110 may be implemented on a first processing device of a first processing platform and the holistic analytic lifecycle automation and provisioning system 120 may be implemented on a second processing device of a second processing platform. It is also to be understood that a given embodiment of the system 100 may include multiple instances of the system elements 110 and 120, although only single instances of such elements are shown in the system diagram for clarity and simplicity of illustration.

Figure 1B:
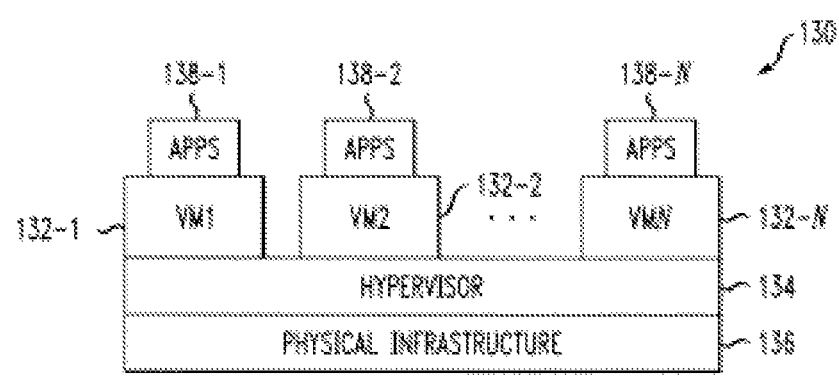
FIG. 1B illustrates a more detailed view of the cloud infrastructure of FIG. 1A.

As shown in FIG. 1B, the cloud infrastructure 130 (corresponding to 110 in FIG. 1A) comprises virtual machines (VMs) 132-1, 132-2, . . . 132-N implemented using a hypervisor 134. The hypervisor 134 is an example of what is more generally referred to herein as "virtualization infrastructure." The hypervisor 134 runs on physical infrastructure 136 (e.g., such as may include CPUs 112 and/or storage devices 116 in FIG. 1A). The cloud infrastructure 130 further comprises sets of applications 138-1, 138-2, . . . 138-N running on respective ones of the virtual machines 132-1, 132-2, . . . 132-N (utilizing associated LUNs or virtual disks) under the control of the hypervisor 134.

Although only a single hypervisor 134 is shown in the example of FIG. 1B, a given embodiment of cloud infrastructure configured in accordance with an embodiment of the invention may include multiple hypervisors, each running on its own physical infrastructure. Portions of that physical infrastructure might be virtualized.

An example of a commercially available hypervisor platform that may be used to implement portions of the cloud infrastructure 130 (110) in one or more embodiments of the invention is the VMware® vSphere® which may have an associated virtual infrastructure management system such as the VMware® vCenter™. The underlying physical infrastructure 136 may comprise one or more distributed processing platforms that include storage products such as VNX® and Symmetrix® VMAX®, both commercially available from EMC Corporation of Hopkinton, Mass. A variety of other storage products may be utilized to implement at least a portion of the cloud infrastructure 130 (110).

Figure 2:
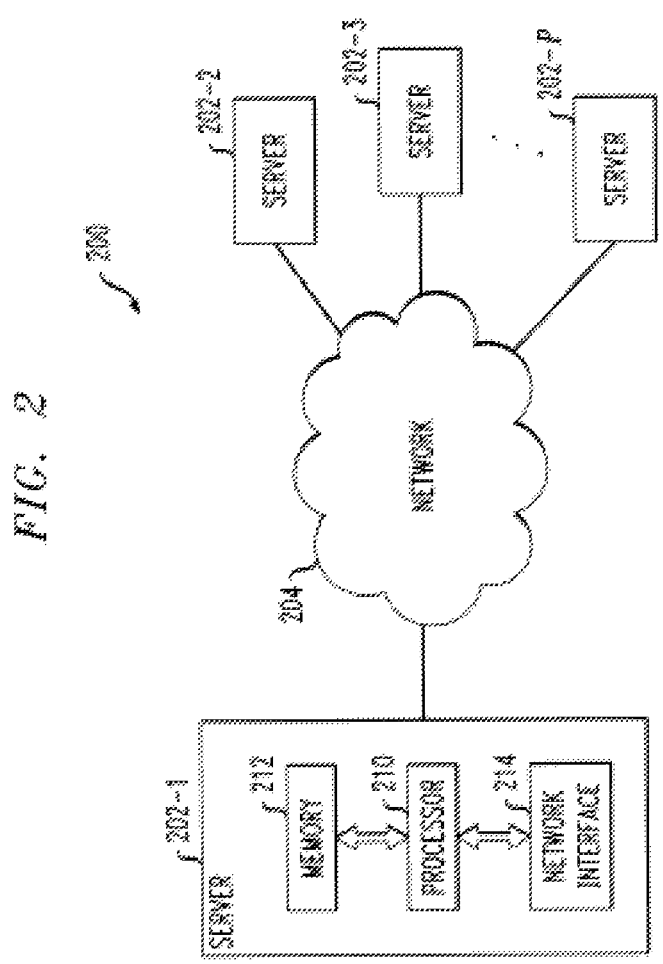
FIG. 2 illustrates a processing platform on which the cloud infrastructure and the holistic analytic lifecycle automation and provisioning system of FIG. 1A are implemented, in accordance with one or more embodiments of the invention.

An example of a processing platform on which the cloud infrastructure 110 and/or the holistic analytic lifecycle automation and provisioning 120 of FIG. 1A may be implemented is processing platform 200 shown in FIG. 2. The processing platform 200 in this embodiment comprises at least a portion of the system 100 and includes a plurality of servers, denoted 202-1, 202-2, 202-3, . . . 202-P, which communicate with one another over a network 204. One or more of the elements of system 100 may therefore each run on a server, computer or other processing platform element, which may be viewed as an example of what is more generally referred to herein as a "processing device." As illustrated in FIG. 2, such a device generally comprises at least one processor and an associated memory, and implements one or more functional modules for controlling certain features of system 100. Again, multiple elements or modules may be implemented by a single processing device in a given embodiment.

The server 202-1 in the processing platform 200 comprises a processor 210 coupled to a memory 212. The processor 210 may comprise a microprocessor, a microcontroller, an application-specific integrated circuit (ASIC), a field programmable gate array (FPGA) or other type of processing circuitry, as well as portions or combinations of such circuitry elements. The memory 212 may be viewed as an example of what is more generally referred to herein as a "computer program product." A computer program product comprises a processor-readable storage medium having encoded therein executable code of one or more software programs. Such a memory may comprise electronic memory such as random access memory (RAM), read-only memory (ROM) or other types of memory, in any combination. The computer program code when executed by a processing device such as the server 202-1 causes the device to perform functions associated with one or more of the elements of system 100. One skilled in the art would be readily able to implement such software given the teachings provided herein. Other examples of computer program products embodying embodiments of the invention may include, for example, optical or magnetic disks.

Also included in the server 202-1 is network interface circuitry 214, which is used to interface the server with the network 204 and other system components. Such circuitry may comprise conventional transceivers of a type well known in the art.

The other servers 202 of the processing platform 200 are assumed to be configured in a manner similar to that shown for server 202-1 in the figure.

The processing platform 200 shown in FIG. 2 may comprise additional known components such as batch processing systems, parallel processing systems, physical machines, virtual machines, virtual switches, storage volumes, logical units, etc. Again, the particular processing platform shown in the figure is presented by way of example only, and system 200 may include additional or alternative processing platforms, as well as numerous distinct processing platforms in any combination.

Also, numerous other arrangements of servers, computers, storage devices or other components are possible in system 200. Such components can communicate with other elements of the system 200 over any type of network, such as a wide area network (WAN), a local area network (LAN), a satellite network, a telephone or cable network, or various portions or combinations of these and other types of networks.

Illustrative details of the holistic analytic lifecycle automation and provisioning system 120 will now be described with reference to FIGS. 3 and 4 with further details of holistic analytic methodologies to be described with reference to FIGS. 5 through 11.

It is to be understood that the spectrum of complex analytic problem types that the holistic analytic lifecycle automation and provisioning system can be used to address is far reaching. By way of example only, the data scientist is typically faced with the task of designing an analytic processing system that handles data associated with tasks such as, for example, a complex research project, a data mining project involving a very large amount of data in one or more different structures (so-called "big data"), one or more applications that a customer entity wishes to be hosted by a service provider entity (e.g., in a data center environment), a business problem, etc. The common problems that the data scientist faces with each of these complex analytic problem types are how to design and provision the computing environment (i.e., platform) that will be used for analysis, what data sets to include in the analysis, what analytic models to build, and how to operationalize the models.

Figure 3:
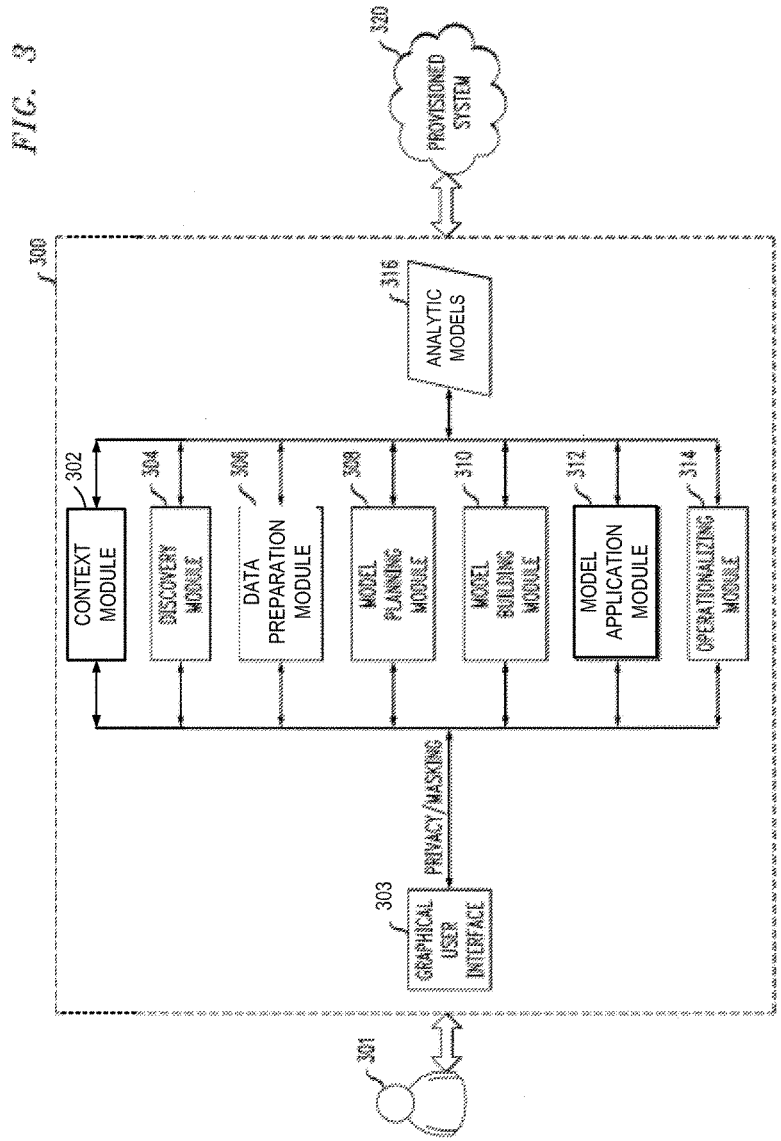
FIG. 3 illustrates a holistic analytic lifecycle automation and provisioning system, in accordance with one embodiment of the invention.
Figure 4:
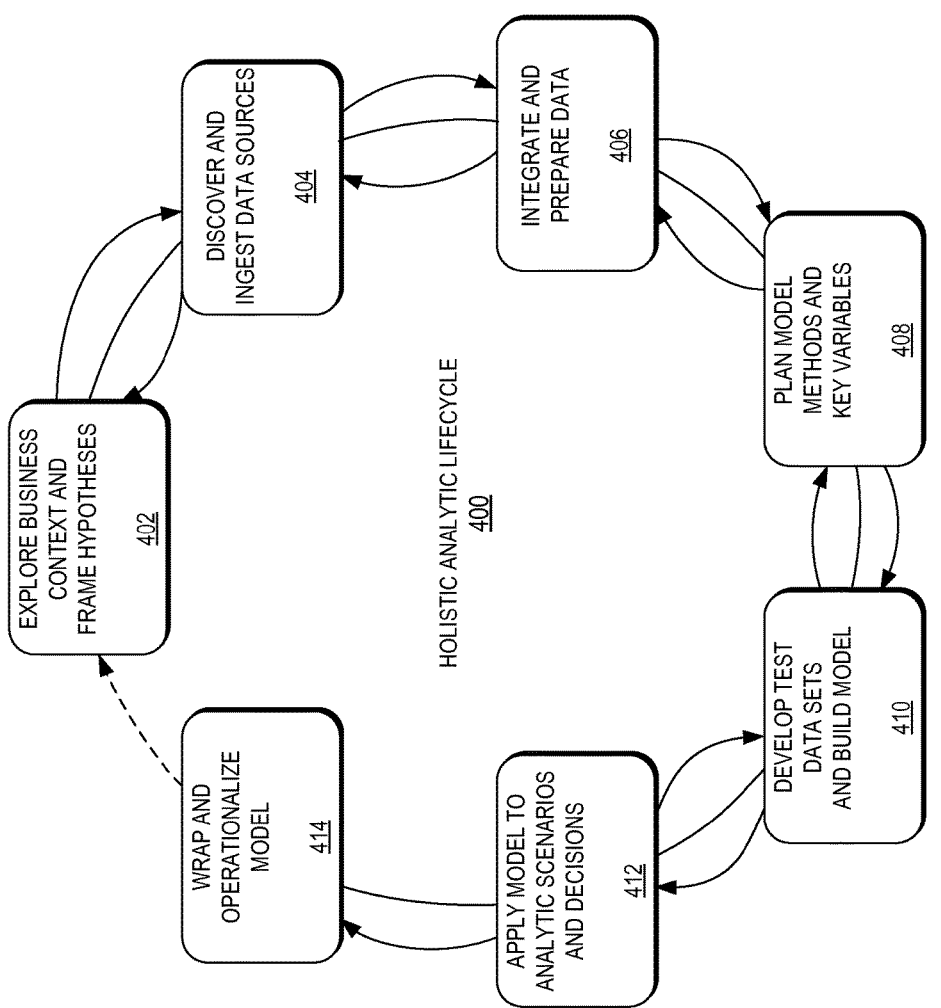
FIG. 4 illustrates a holistic analytic lifecycle automation and provisioning methodology, in accordance with one embodiment of the invention.

FIG. 3 illustrates a system for assisting the data scientist, inter alia, to overcome the problems mentioned above. More particularly, FIG. 3 depicts a holistic analytics lifecycle automation and provisioning system 300 (e.g., corresponding to system 120 of FIG. 1) that allows a data scientist 301 (or some other user or users, e.g., business user) to design and generate a provisioned system 320 that can be used to analyze and otherwise process data associated with a given complex analytic problem.

As shown, system 300 includes a graphical user interface 303, a context module 302, a discovery module 304, a data preparation module 306, a model planning module 308, a model building module 310, a model application module 312, an operationalizing module 314, and one or more analytic models 316. Note that the components of system 300 in FIG. 3 may be implemented on a single computing system, or one or more components of system 300 may be implemented in a distributed computing system, e.g., across multiple servers 202 in FIG. 2.

The graphical user interface (GUI) 303 is the interface(s) through which the data scientist 301 interacts (e.g., enters data, responses, queries to one or more modules, and receives data, results, and other output generated by one or more modules) with system 300. It is to be understood that the interface used to interact with system 300 does not necessarily have to be a graphical user interface, but rather could be through command lines or some other form of input/output. As such, embodiments of the invention are not limited to any particular form of user interface.

Note that the seven modules of the system 300 respectively correspond to the phases of a holistic analytic lifecycle. FIG. 4 depicts the seven phases of a holistic analytic lifecycle 400, according to one embodiment of the invention, including: an explore business context and frame hypothesis phase 402, a discover and ingest data sources phase 404, an integrate and prepare data phase 406, a plan model methods and key variables phase 408, a develop test data sets and build model phase 410, an apply model to analytic scenarios and decisions phase 412, and a wrap and operationalize model phase 414. Each component of the system 300 assists the data scientist 301 in generating the analytic model 316 that is used to provision the actual analytics system (provisioned system 320) that addresses the given complex analytic problem.

A description of each holistic analytic lifecycle phase will now be given with an exemplary problem for which the system 320 is being designed and provisioned. In this example, the problem is a business problem. More specifically, and by way of example only, the business problem is assumed to be the task of accelerating innovation in a global technology corporation. Three aspects of this problem may be: (a) the tracking of knowledge growth throughout the global employee base of the corporation; (b) ensuring that this knowledge is effectively transferred within the corporation; and (c) effectively converting this knowledge into corporate assets. Developing a holistic analytic system (320 in FIG. 3) that executes on these three aspects more effectively should accelerate innovation, which will thus improve the viability of the corporation. Thus, the task of system 300 is to develop such a holistic analytic system. Of course, it is to be understood that this corporate innovation acceleration problem is just one of a myriad of examples of complex data problems that system 300 using a holistic analytic lifecycle 400 can be used to address.

The increase in data volume, velocity, variety, and complexity has led to the rise of Big Data and data science analytical projects. A new process for approaching these complex analytical projects is beneficial for the enterprise. Example embodiments of the present invention enable organizations to have a holistic view on organizing and approaching complex holistic analytic projects, and enables them to follow an established methodology to structure, guide, simplify and streamline the way they approach complex, open-ended business and data problems.

Four guidelines for holistic analytic projects include:
Follow a Methodology for Performing Big Data Projects Across an Enterprise.

This includes redefining a business problem as an analytic challenge, identifying the right modeling techniques and suitable data sets, and operationalizing the resulting models. This process addresses the emerging needs related to big data projects and for deriving operational benefit from big data sources.

Employ Traceability Across a Holistic Analytic Project.

Traceability includes the ability to understand the origin and provenance of the data and its use in specific tasks and processes, as described in U.S. patent application Ser. No. 13/336,613 filed on Dec. 23, 2011 and entitled "Managing Data Sets By Reasoning Over Captured Metadata" and Ser. No. 13/538,219 filed on Jun. 29, 2012 and entitled "Dynamic Information Assembly for Designated Purpose Based on Suitability Reasoning Over Metadata," the disclosures of which are incorporated by reference herein in their entirety. Such traceability clarifies the scope and applicability of analytic models, and aids decisions on when to recalibrate or regenerate models based on changing data. Building explicit traceability into the overarching framework and methodology aids human and programmatic understanding of which processes and data feeds worked well and which required the highest degree of improvement, thus infusing best practices and dynamic choices into analytic model development over time.

Follow a Holistic View of the Actors and Roles Required for Conducting Big Data Analytic Projects Across an Enterprise.

The Data Scientist role is new, and therefore may require a new approach to understanding the interplay with application development and deployment roles in both business and information technology (IT), and the interdependencies of these roles within this iterative process for planning and executing big data projects.

Traditional approaches involve a linear progression of steps in an analytic process, similar to a stage gate process, proceeding sequentially from one state to the next in an analytic process. In addition, they are designed for simple or traditional data analytics problems, rather than more complex data science scenarios that are emerging. Also, they only look at analytics from the point of view of the person performing one facet of the analysis, such as from the point of view of the person developing the data architecture or the predictive models, making it difficult to understand dependencies on other areas of the organization, and what people in other roles must do to support the analytical approach in parallel. Additionally, model operationalization is not well planned for or supported, until the last minute.

However, the holistic methodology for big data analytics in example embodiments of the present invention enables key actors within an organization to understand their roles in a holistic manner as it applies to complex, big data analytics projects. Most analytical methodologies are designed for specific roles, such as a Data Scientist, Data Miner, or business analyst, leaving out the related interactions for other areas of the organization in order to make analytic projects succeed in organizations today that are trying to make use of big data. Published analytical methodologies rarely describe the operationalization of analytic models, or if they do, such operationalization is performed at the end of the process rather than being integrated throughout. This methodology also brings advantages of explicit connection to business problems, traceability (described above) and early planning for integration with applications that facilitate operationalization and deployment of analytic models for business impact.

As the arrows in the holistic analytic lifecycle 400 indicate, the seven phases are iterative and interrelated/interconnected, and as such, one phase can be returned to from one of the other phases in the process. It is to be appreciated that while FIGS. 5-11 show details of the respective phases 402, 404, 406, 408, 410, 412, 414 as methodologies 500, 600, 700, 800, 900, 1000, 1100, one or more of the steps shown therein can be performed alone and in any order (i.e., different than that shown in the figures). Also, two or more steps may be combined.

"Explore Business Context and Frame Hypothesis" Phase 402 (Performed by Context Module 302 in System 300)

The data scientist may develop an initial analytic plan. The analytic plan may lay the foundation for all of the work in the analytic project being developed to address the problem, which may be a business problem. That is, the analytic plan assists the data scientist 301 in identifying the problem, a set of hypotheses, the data set, a preliminary plan for the creation of algorithms that can prove or disprove the hypotheses, and a potential approach to wrapping these algorithms in applications for operationalization. By way of example only, in the corporate innovation acceleration problem mentioned above, one hypothesis identified by the user as part of the analytic plan may be that an increase in geographic knowledge transfer in a global corporation improves the speed of idea delivery. This hypothesis paves the way for what data will be needed and what type of analytic methods will likely need to be used.

Figure 5:
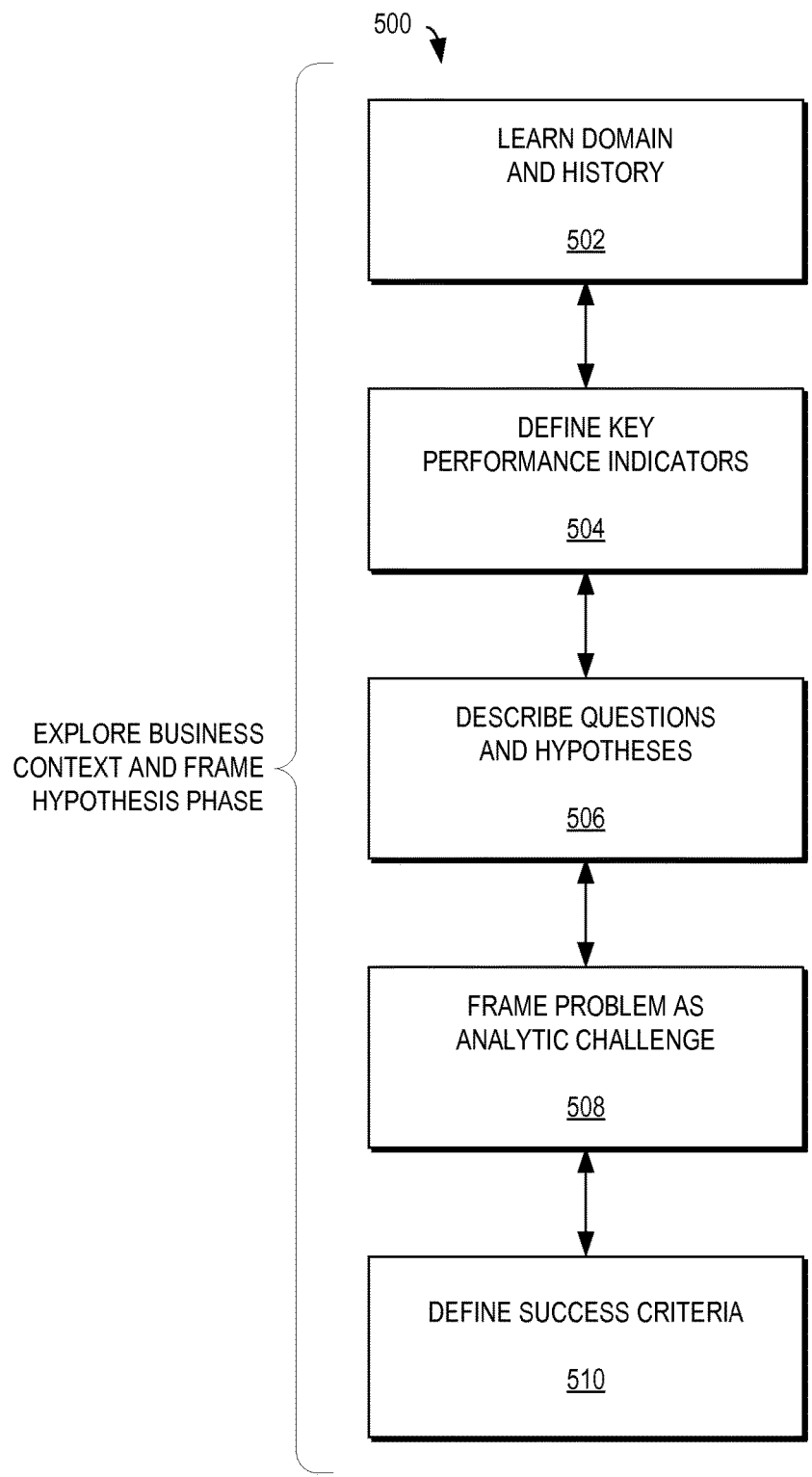
FIG. 5 illustrates details of an explore business context and frame hypothesis phase of a holistic analytic lifecycle, in accordance with one embodiment of the invention.

FIG. 5 illustrates details of the "explore business context and frame hypothesis" phase 402 of a holistic analytic lifecycle 400. The holistic analytic lifecycle 400 may determine a business context associated with the analytic problem. A business context may be a context in which the analytic problem is posed. For example, the context may be cross-sell marketing on the Internet or providing better buying recommendations on an e-commerce site. A data scientist may examine various demographics, psychographics, prior history, and sentiment analysis in order to have a better idea of how to solve the analytic problem.

For the purpose of example, let's consider the scenario of how banks decide whether to offer a loan to someone. Following the methodology, the holistic analytic lifecycle 400 may learn the business domain and history (502) by learning how the decision-making process is currently done and what has been tried in the past. That is, the holistic analytic lifecycle 400 may learn whether decisions are made on a manual or fully or partially automated basis, what the points of difficulty are in the current process, what works well for the business and why. Additionally, the holistic analytic lifecycle 400 may determine attributes associated with the analytic problem. For example, the holistic analytic lifecycle 400 may define Key Performance Indicators (KPIs) (504) which, in this example, may be metrics such as percent of loan applicants approved, time for decision (e.g., one minute, one hour, one month), the price of the loan (i.e., is it competitive with a bank's peers and pricing offered on the general market), and the eventual default rate on loans.

The holistic analytic lifecycle 400 also may determine additional attributes associated with the analytic problem, such as business questions and hypotheses (506), and possibly identify a target business application and deployment context for operationalization of the analytic model (e.g., 316 of FIG. 3). The context module 302 may determine the category (or categories) of the general problem type based on groups of analytical methods such as, but not limited to, clustering, classification, text mining and/or predictive models. Additionally, the context module 302 may assist the data scientist or business user to assess the available resources such as, but not limited to, people, processes, technologies, data sources, systems, and time.

Returning to the example, the bank's websites may not make loan customers a fast enough decision, and customers have the perception that they are denied loans too often, and for unfair or arbitrary reasons. Loan applicants may complain that, if denied, they don't know what they can do to improve their chances of being improved in the future. As a result, the bank feels competitive pressure to expand their online services, as other companies are gaining more online revenue from prospective applicants.

It is realized that one of the biggest challenges in holistic analytics is framing the problem (e.g., business problem) into an approach that can be tested with data and analytics. Accordingly, the bank may frame its hypotheses within the holistic analytic lifecycle 400 as an analytic challenge (508): Can they develop an automated tool to provide lending decisions to people applying online in less than 1 minute? Can this application provide guidance tailored to an applicant to guide them in improving their likelihood of being approved in the future or getting a better price on a loan? Can the new approach provide consistency in the lending and pricing decisions, and reduce manual and human intervention, which may appear idiosyncratic? Success criteria of these analytic challenges also may be defined (510), such as successfully meeting the analytic challenges, or coming within a measurable amount of success.

"Discover and Ingest Data Sources" Phase 404 (Performed by Discovery Module 304 in System 300)

Figure 6:
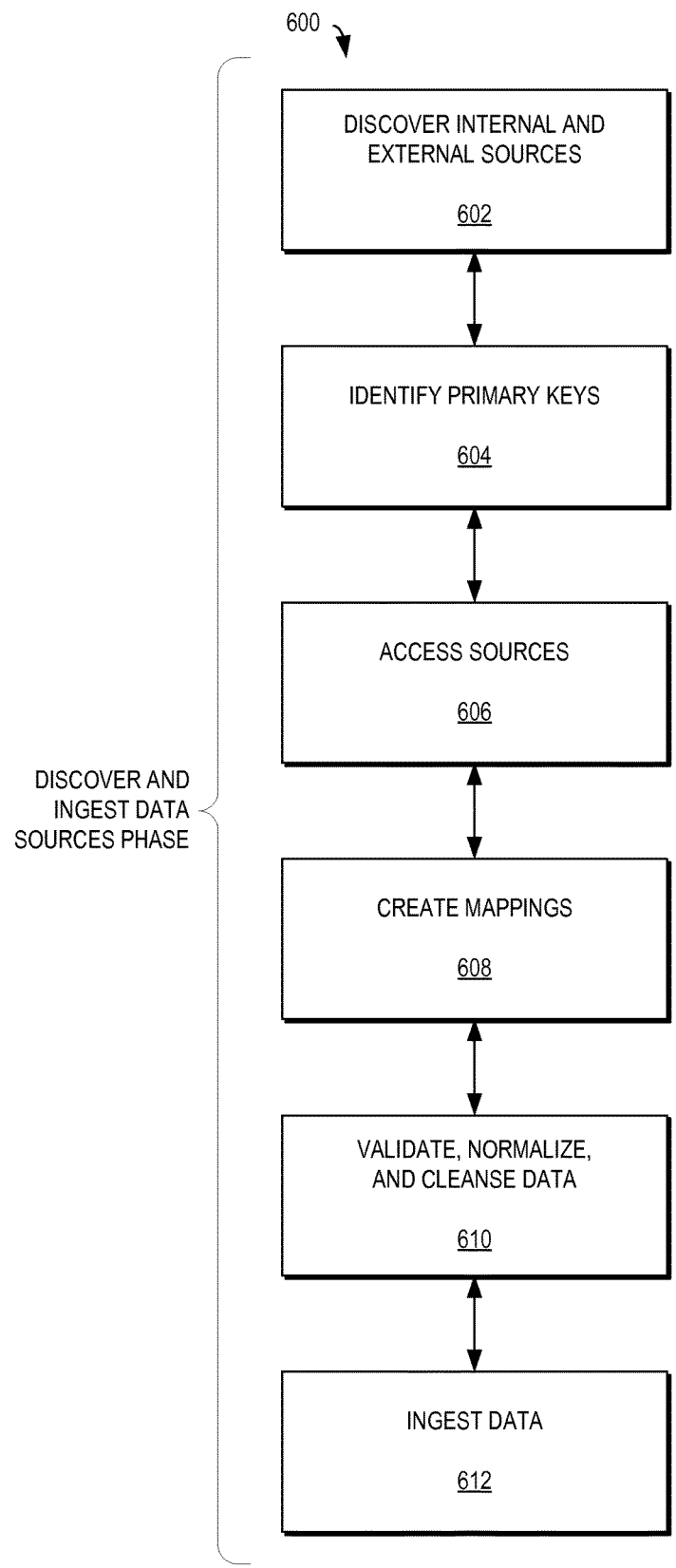
FIG. 6 illustrates details of a discover and ingest data sources phase of a holistic analytic lifecycle, in accordance with one embodiment of the invention.
Figure 7:
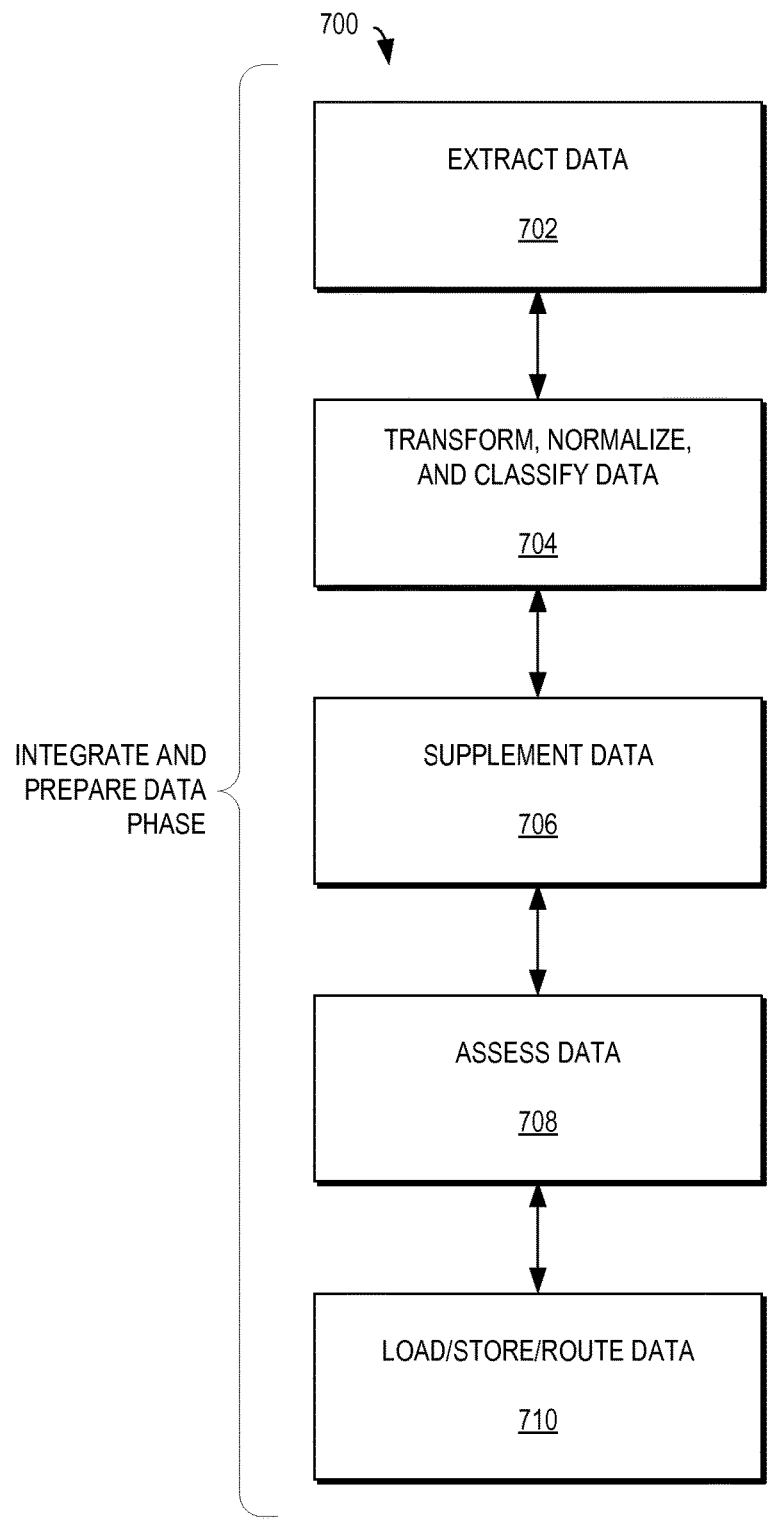
FIG. 7 illustrates details of an integrate and prepare data phase of a holistic analytic lifecycle, in accordance with one embodiment of the invention.

FIG. 6 illustrates details of the "discover and ingest data sources" phase 404 of a holistic analytic lifecycle 400. The "discover and ingest data sources" phase 404 investigates what data sources are plausibly interesting for analysis, what those data sources are about (e.g., customers, products, prior history), and if the data is relevant.

Accordingly, the discovery module 304 may assist the data scientist or business user to discover internal and external sources of data (602) for use in solving the problem. At this stage, someone on the project, such as a Data Engineer, may identify the primary keys (604) of and between important data tables and databases that can subsequently be integrated for the analysis work by the Data Scientist. This allows the data scientist or business user to aggregate sources for previewing the data and provide high-level understanding, review the raw data, determine the structures and tools needed, and scope the kind of data needed for this kind of problem.

For example, at this phase, one may consider the volume, type, structure, velocity of change and time span of the data needed to test one or more hypotheses. Also the data scientist or business user should keep in mind the data sources needed, and ensure to get access to more than simply aggregated data. In most cases, it is beneficial to utilize raw data (non-conditioned) in order to run it through the models in a subsequent phase. A thorough diagnosis of the data situation will inform the kinds of tools and techniques to use in the subsequent phases. In addition, performing data exploration in this phase helps determine the amount of data needed, in terms of the amount of historical data to obtain, the structure and format. That is, the system helps the data scientist or business user develop an idea based on the scope of the data and allows him/her to validate the idea with one or more domain experts on a given project. The discovery module 304 then may assist the data scientist or business user to access the sources of data (606), create mappings in the data (608), validate, normalize, and cleanse the data (610), and ingest the data (612).

These steps will become clearer in returning to the bank loan example from above. Much of the data identified may be similar to: income data, such as paystubs and income tax records; employment history to establish the ability to meet loan obligations; credit history, including credit scores and outstanding debt; and appraisal data associated with the asset that the loan is being taken out against (e.g., home, RV, boat, car, violin, etc.). These kinds of data typically may reside in the bank's Loan Origination System (i.e., internal source), which may store credit and application history going back ten or more years.

In addition to the traditional kinds of data discussed above, the bank may examine other, public (i.e., external) sources of data to accelerate the time required to make loan decisions and also to have a more holistic view of the decision making process and applications. This may include some additional data sources, such as: home price trends from data sources such as Zillow and eppraisal, which may be integrated with appraisal data to identify patterns or conflicting data; census data, which may can be used to understand population migration trends and the potential impact on home values or geographic income variation; localized job trends, which may be used to identify patterns in prosperity in a specific area; historic Loan Data from the lender's own records or purchased data from third parties that may aggregate loan data from public records, which may be used to find patterns that point to more or less risky behavioral patterns; and social and professional history of applicants, which may be used to correlate behavior in personal and professional life through sources like Twitter, Facebook, LinkedIn, etc., which may have an impact on the ability to pay or continue paying debts.

"Integrate and Prepare Data" Phase 406 (Performed by Data Preparation Module 306 in System 300)

The "integrate and prepare data" phase 406, which focuses on conditioning the data, then may begin. The data should be in an acceptable shape, structure, and quality to enable the subsequent analysis.

Continuing with the corporate innovation acceleration example, assume that the type of data that the analytics project relies on falls into two categories: (i) an "idea submission" data set (essentially a large-scale database containing structured data); and (ii) a globally-distributed set of unstructured documents representing knowledge expansion within the corporation in the form of minutes and notes about innovation/research activities. It is realized that these data sets cannot be analyzed in their raw formats. In addition, it is possible that the data is not of sufficient quality. Furthermore, the data likely contains inconsistencies.

Regarding transformations, it is preferred that module 306 transform the data after it is obtained, i.e., ELT (Extract, Load, Transform), as opposed to ETL (Extract, Transform, Load). However, the transformation paradigm can also be expressed as ETLT (Extract, Transform, Load, Transform again), in order to attempt to encapsulate both approaches of ELT and ETL. In either the ELT or ETLT case, this allows analysts to choose to transform the data (to obtain conditioned data) or use the data in its raw form (the original data), without losing the granular details that may be lost if they are working only with summarized data. Examples of transformation tools that can be available as part of data preparation module 306 include, but are not limited to, Hadoop® (Apache Software Foundation) for analysis, Alpine Miner® (Alpine Data Labs) for creating analytic workflows, and R transformations for many general purpose data transformations. Of course, a variety of other tools may be part of module 306.

It is further realized that there are activities that allow a data scientist to assess whether or not the data set(s) he/she is using will be able to meet the goals outlined in the data analytic plan. These activities are depicted in methodology 700 in FIG. 7.

(i) Step 702: Extract data. The data scientist 301 lists out all the data sources and determines whether key data is available or more information is needed. The data sets may be brought together for integration and preparation. This can be done by referring back to the analytic plan developed in phase 404 to determine if one has what is needed, or if more data must be loaded. The data scientist 301 may filter subsets of data or choose between high and low fidelity versions of the data.

(ii) Step 704: Transform, normalize, and classify the data. Perform data conditioning. During this process, the data scientist 301 also discerns what to keep versus what to discard. Discarding too much or filtering out too much information can cause many problems when it comes time to analyze data. While it can be beneficial to normalize data, if data is normalized too much or too early in the process, it can restrict the data available to analyze in subsequent phases. An example of this is an analysis for fraud detection on credit card usage. Many times, the outliers in this data population can represent higher-risk transactions that may be indicative of fraudulent credit card activity. Often, data analysts and database administrators may inadvertently filter out these outliers or transform and clean them before being loading the records into a database. For this reason, ELT or ETLT, as described above, is encouraged so that you have data in its raw state and also the ability to transform it after loading as well. This approach provides clean data to analyze after it is in the database and the data in its original form for finding hidden nuances in the data.

Further, transforming the data may include masking or anonymizing sensitive data, merging or integrating heterogeneous data sources, and aggregating data along hierarchical dimensions.

(iii) Step 706: Supplement data. The transformed data then may be enriched with new metrics and enhancements.

(iv) Step 708: Assess data. The data scientist 301 can create overviews, zoom and filter, get details, and begin to create descriptive statistics and evaluate data quality for decision making. Taking an overview of the data may include using data visualization methods or diagnostic tools such as descriptive statistics to learn about the quality and distribution of the dataset. Step 708 can also run descriptive statistics and assess data quality.

Further, complex events may be recognized in the data. Given the broader picture across multiple data sources, the data scientist 301 may be able to notice (i.e., infer) complex events that happen using complex event processing (CEP). This may enable more sophisticated modeling at a later phase in the holistic analytic lifecycle.

(v) Step 710: The data then may be loaded as described above.

It is realized that one should review data to ensure that calculations remain consistent within columns or across tables for a given data field. For instance, questions should be considered such as, but not limited to, whether customer lifetime value changed at some point in the middle of data collection, or if a financial interest rate calculation changed from simple to compound at the end of the year. In addition, the data scientist will examine the distribution of the data and evaluate if this remains consistent over all the data, and if not, what can be done to accommodate complex data distributions. At this phase, one should assess the granularity of the data, the range of values, and level of aggregation of the data. For instance, for marketing data, if one is interested in targeting customers of "having a family" age, does training data represent that, or is it full of seniors and teenagers? Examine whether the units of measure for a given variable are consistent and will enable one to complete the desired analysis, as outlined in the analytic plan. For instance, for time-related variables, are the measurements daily, weekly, monthly? Is time measured in seconds everywhere, or is it in milliseconds some places? Determine if the data is standardized/normalized, whether the scales are consistent, and how normal or irregular the data is? For geospatial data sets, determine whether state abbreviations are consistent across the data. These are some typical considerations that should be part of the thought process as the data scientist or business user assesses the data with which the system will work. Becoming knowledgeable about the data will be critical when it comes time to construct and run models later in the process.

"Plan Model Methods and Key Variables" Phase 408 (Performed by Model Planning Module 308 in System 300)

At this point in the holistic analytic lifecycle 400, the data scientist 301 has generated some hypotheses, and described potential data sets. In this phase, the Data Scientist and Data Engineers may work together to consider possible applications to use later on for wrapping the modeling logic. The Data Scientist and Business Intelligence Analyst may explore the various kinds of data (e.g., social data, loan and credit data, job trends, etc.), including looking at the data quality and creating data visualizations of key variables. After doing this, the Data Scientist and working team should have an idea of the kinds of models to attempt.

Model planning represents the conversion of the business problem into a data definition and a potential analytic approach. A model contains the initial ideas on how to frame the business problem as an analytic challenge that can be solved quantitatively. There may be a strong link between the hypotheses made in phase 404 (discovery phase) and the analytic techniques that will eventually be chosen. Model selection (part of the planning phase) can require iteration and overlap with phase 406 (data preparation). Multiple types of models may be applicable to the same business problem. Selection of methods can also vary depending on the experience of the data scientist. In other cases, model selection is more strongly dictated by the problem set.

Described below are a few exemplary methods and approaches (but not an exhaustive list) that may be considered by the data scientist 301 in the exemplary accelerated corporate innovation hypothesis given above:

(i) Use Map/Reduce for extracting knowledge from unstructured documents. At the highest level, Map/Reduce imposes a structure on unstructured information by transforming the content into a series of key/value pairs. Map/Reduce can also be used to establish relationships between innovators/researchers discussing the knowledge.

(ii) Natural language processing (NLP) can extract "features" from documents, such as strategic research themes, and can store them into vectors.

(iii) After vectorization, several other techniques could be used:

(a) Clustering (e.g., k-means clustering) can find clusters within the data (e.g., create 'k' types of themes from a set of documents).

(b) Classification can be used to place documents into different categories (e.g., university visits, idea submission, internal design meeting), as well as other entities such as prospects for loans.

(c) Regression analysis can focus on the relationship between an outcome and its input variables, and answers the question of what happens when an independent variable changes. Regression analysis can help in predicting outcomes. This could suggest where to apply resources for a given set of ideas.

(d) Graph theory (e.g., social network analysis) is a way to establish relationships between employees who are submitting ideas and/or collaborating on research.

Figure 8:
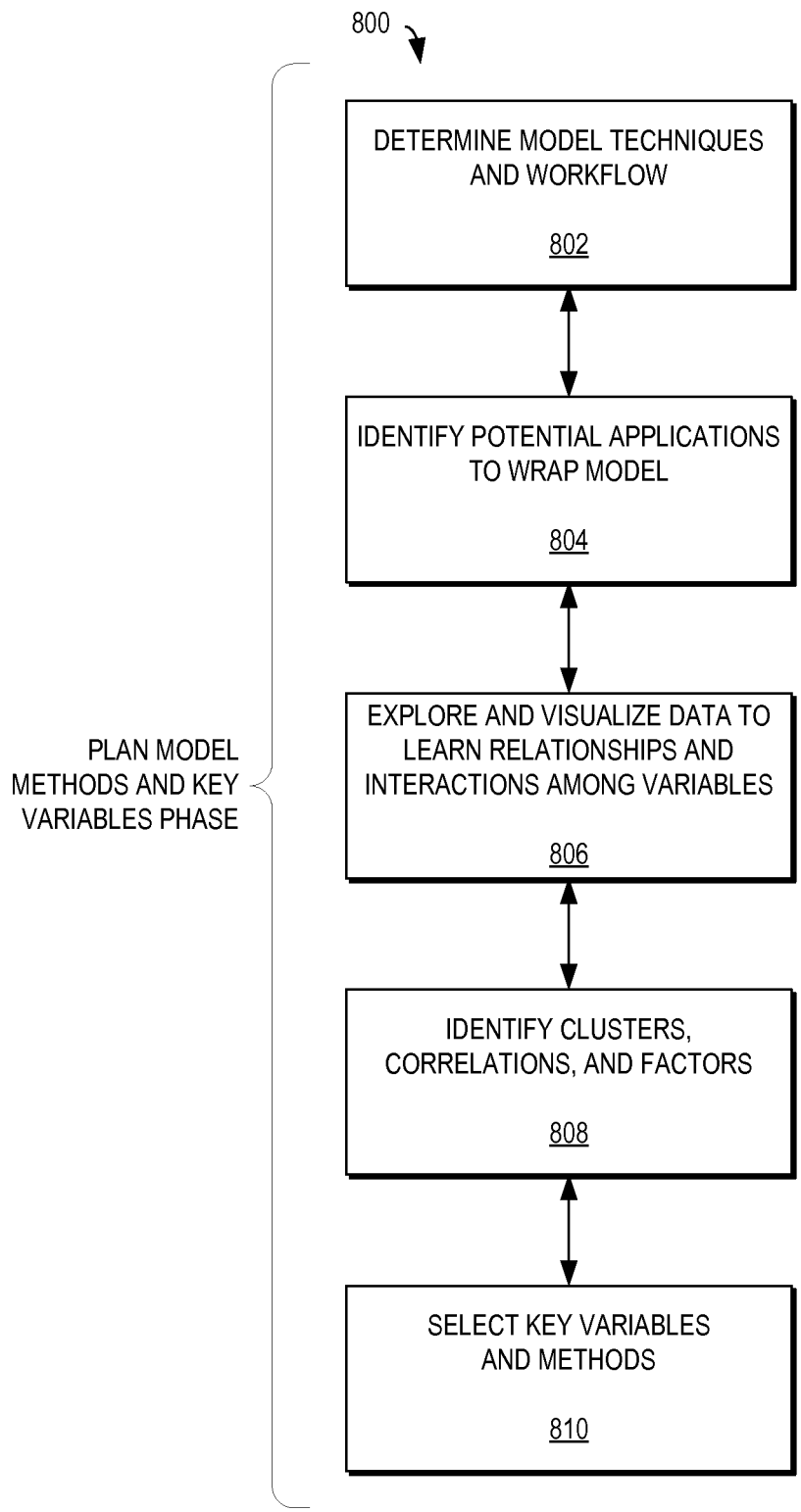
FIG. 8 illustrates details of a plan model methods and key variables phase of a holistic analytic lifecycle, in accordance with one embodiment of the invention.

FIG. 8 illustrates details of the model planning phase 408 of a holistic analytic lifecycle 400.

Step 802: Determine model techniques and workflow. Assessing the structure of the data is one of the key shifts in the way data scientists or business users should approach analytics. This consideration is driven heavily by the concept of "big data," which is providing new data in new structures (e.g., images, surveillance video, text messages, sensors, GPS-enabled smart phones, etc.) and therefore evaluating the structure of data is becoming increasingly important. The structure of the data is one factor that will dictate the tools and analytical techniques one can use in the next phase. Depending on whether one is analyzing textual data or transactional data will dictate different tools and approaches (e.g., sentiment analysis) as compared with forecasting market demand based on structured financial data (e.g., revenue projections and market sizing using regressions).

Further, the methodology includes ensuring that the analytical techniques enable the data scientist or business user to meet the business objectives and prove or disprove the working hypotheses. At this step, one can determine if the situation warrants a single test (e.g., Binomial Logistic Regression or Market Basket Analysis) or a series of techniques as part of a larger analytic workflow.

Step 804: Identify potential applications to wrap model. Converting the model created in an in-memory application (such as R, Octave, etc.), a native statistical package to SQL enables the system to run the operation in-database, which provides optimal performance during runtime, or code (e.g., Java). Here, one can consider the major data mining and predictive analytical techniques, such as categorization, association rules, and regressions. One can determine if the system is using techniques that are best suited for structured data, unstructured data, or a hybrid approach. As mentioned above, MapReduce can be leveraged to analyze unstructured data.

Step 806: Explore and visualize data to learn relationships and interactions among variables. There is some exploration in the data preparation phase 406, mostly for data hygiene reasons and to assess the quality of the data itself. In this phase, it is important to explore the data to understand the relationships among the variables to inform selection of the variables and methods, and to understand the problem domain. Using tools to help with data visualizations can help with this, and aid in previewing the data and assessing relationships between variables.

Step 808: Identify clusters, correlations, and factors. The data scientist 301 then may explore the variables to determine clusters and correlations of factors. The fact that correlations and clusters exist among variables may be of interest, but does not necessarily indicate causality.

Step 810: Variable Selection. In this step, inputs are gathered from stakeholders and domain experts, the essence of predictors is captured, and a technique for dimensionality reduction is leveraged. Iterative testing may be used to confirm the most significant variables.

"Develop Test Data Sets and Build Model" Phase 410 (Performed by Model Building Module 310 in System 300)

In the model building phase, the system experimentally constructs and runs the one or more models that the data scientist 301 selected in phase 408. The model(s) may be executed on a portion of the original (raw) data, a portion of the conditioned data (transformed in phase 406), or some combination thereof. At this point, the working team has a good understanding of the data sets, the relationships among the data, such as complex events, social graphs, and variables that may be predictive of the outcomes for pricing or loan decisions. In the context of the bank loan example, the working team may develop a classification model, such as Logistic Regression or Decision Trees, to predict the likelihood of loan approval for each applicant. After executing the model, the Data Scientist can identify loans with a greater probability for successful underwriting then compare with actual loan originations to train the algorithm and enable predictions for future users. In this phase, the initial data analytic plan is updated to form a refined data analytic plan.

For example, Map/Reduce algorithm, NLP, clustering, classification, regression analysis and/or graph theory models are executed by module 310 on a test sample of the data identified and conditioned by module 306 in phase 406 (data preparation). Here the data scientist 301 is able to determine whether the models he/she selected are robust enough (which depends on the specific domain of the data problem being addressed) and whether he/she should return to the model planning phase 408. For example, in the corporate innovation acceleration example, some portion of the data sets identified in the earlier phases (e.g., structured idea submissions and unstructured support documents) is processed with the selected models.

Figure 9:
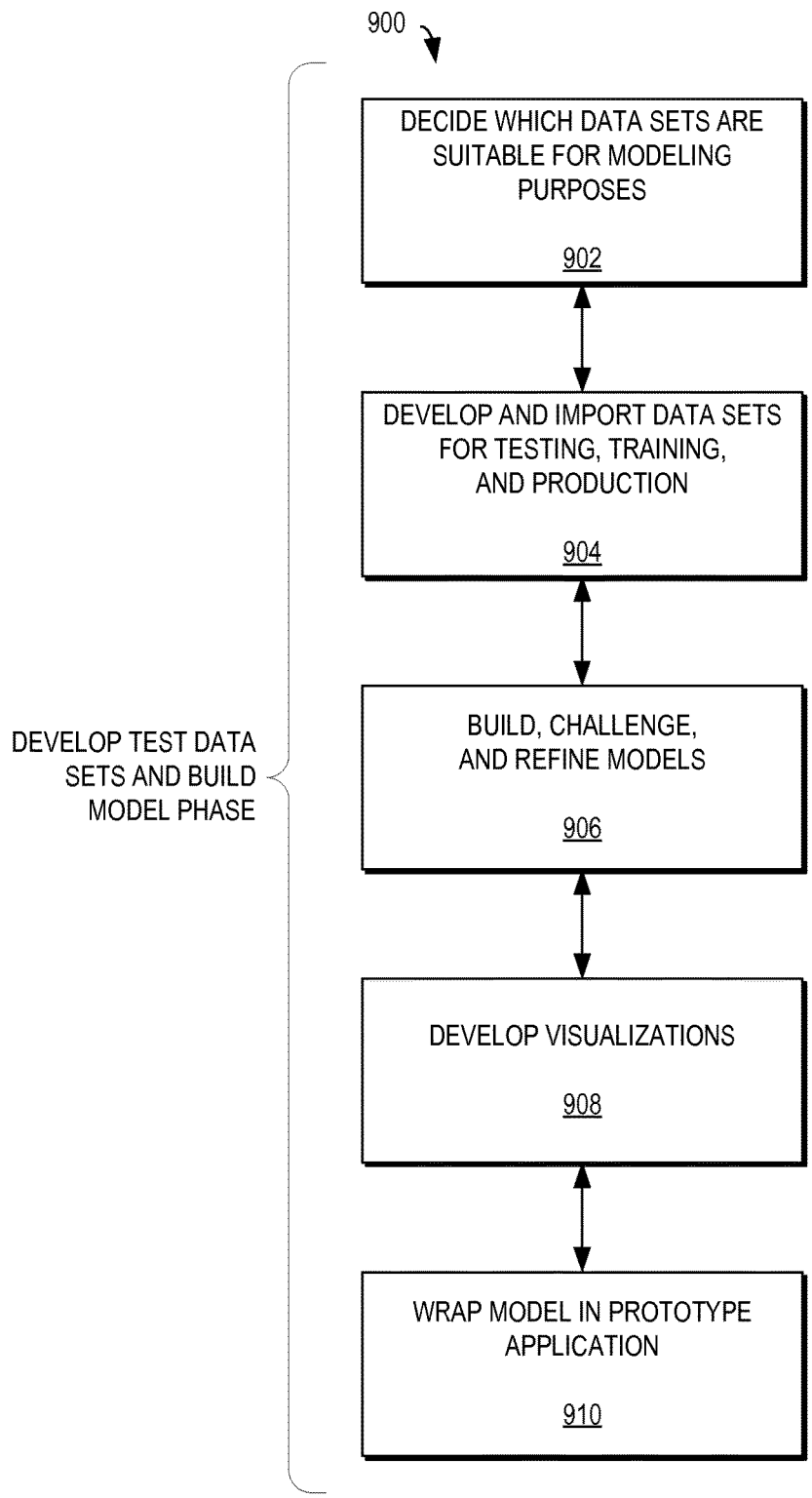
FIG. 9 illustrates details of a develop test data sets and build model phase of a holistic analytic lifecycle, in accordance with one embodiment of the invention.

FIG. 9 illustrates details of the model building phase 410 of a holistic analytic lifecycle 400.

Step 902: Decide which data sets are suitable for modeling purposes. The data scientist or business user develops data sets for testing, training, and production purposes. The data scientist or business user needs to ensure that the model data is sufficiently robust for the model and analytical techniques, i.e., use smaller, test sets for validating approach, and a training set for initial experiments.

Step 904: Develop and import data sets for testing, training, and production. In this phase, the model is fit on the training data and evaluated (scored) against the test data. Generally, this work takes place in a prototype environment, not in the live production environment. The phases of model planning and model building overlap quite a bit, and in practice one can iterate back and forth between the phases for a while before settling on a final model. Some methods require the use of a training data set, depending on whether it is a supervised or unsupervised algorithm for machine learning. Although the modeling techniques and logic required to build this step can be highly complex, the actual duration of this phase can be quite short, compared with all of the preparation required on the data and defining the approaches.

Step 906: Build, challenge, and refine models. Some environments for model building may automatically refine models through a challenge process in which the best performing model(s) survive. Using genetic algorithms to breed better neural nets is another approach to refinement. As part of this phase, the following steps may be conducted:

(1) Execute the one or more models defined in the model planning phase.

(2) Where possible, convert the models to SQL (structured query language) or similar appropriate database language and execute as in-database functions, since the runtime will be significantly faster and more efficient than running in memory. Execute R models on large data sets as PL/R or SQL (PL/R is a PostgreSQL language extension that allows one to write PostgreSQL functions and aggregate functions in R).

(3) Use, for example, R (or Octave) models on file extracts for testing and small data sets.

(4) Assess the validity of the model and its results (for instance, confirm it accounts for most of the data, and has robust predictive power).

(5) Fine tune the models to optimize the results (for example, modify variable inputs).

(6) Record the results, and logic of the model.

Step 908: Develop visualizations. While doing these iterations and refinement of the model, consider the following:

Does the model look valid and accurate on the test data?

Does the model output/behavior make sense to the domain experts? That is, does it look like the model is giving "the right answers," or answers that make sense in this context?

Is the model accurate enough to meet the goal?

Is it avoiding the kind of mistakes it needs to avoid? Depending on context, false positives may be more serious or less serious than false negatives, for instance.

Do the parameter values of the fitted model make sense in the context of the domain?

Do you need more data or more inputs? Do you need to transform or eliminate any of the inputs?

Do you need a different form of model? If so, the user will need to go back to the model planning phase and revise the modeling approach.

Step 910: Wrap model in prototype application. The best environment is created (either as a staging environment or within a prototype environment) for building models and workflows including, but not limited to, fast hardware, parallel processing, etc. For example, with respect to the bank loan example, the model and accompanying logic may be encapsulated within an application that may become embedded within the bank's website and online origination system.

"Apply Model to Analytic Scenarios and Decisions" Phase 412 (Performed by Model Application Module 312 in System 300)

In the apply model to analytic scenarios and decisions phase 412, the analytic plan that was initially developed in phase 402 and fine-tuned through phases 404, 406, 408 and 410 may be refined by the data scientist (i.e., as a refined or final analytic plan). The final analytic plan at this point in the DAL 400 may be referred to as an analytic model (316 in FIG. 3).

In the context of the lending example, the team can identify the key drivers of lending decisions and pricing by identifying key findings (e.g., predictors, classifiers, segments, rankings, estimates, decisions). These may be a set of variables with high (or unexpected) information value that can be quantified and used to determine whether or not a loan applicant will be approved and what kind of pricing should be offered. In addition, instead of waiting 30 or 60 days to arrange for a physical home inspection (in the case of mortgage lending), the model could use Census data, job trends, and housing market data to determine the volatility of a house someone is interested in buying, and whether its value is increasing, decreasing or stable. This kind of prediction can be done in minutes with a high degree of confidence, and reduce the need for a human, in-person inspection in cases deemed to have stable or increasing property values. The outcome of this work may be that the model saves $20 million in lost applicant revenue in the first year, as people who otherwise would have taken their business elsewhere can now get a decision and feedback in under 1 minute (instead of days, or weeks). In addition, because the modeling process uncovered the predictors of loan pricing and decision, the website can give feedback to applicants and tell them where they need to improve (apply for a different loan type, explore properties in a different part of the city, etc.) so they can increase their chances of getting a loan in the future or qualifying for a different loan. In addition, the website could be triggered to provide referrals to credit counselors, as needed.

Figure 10:
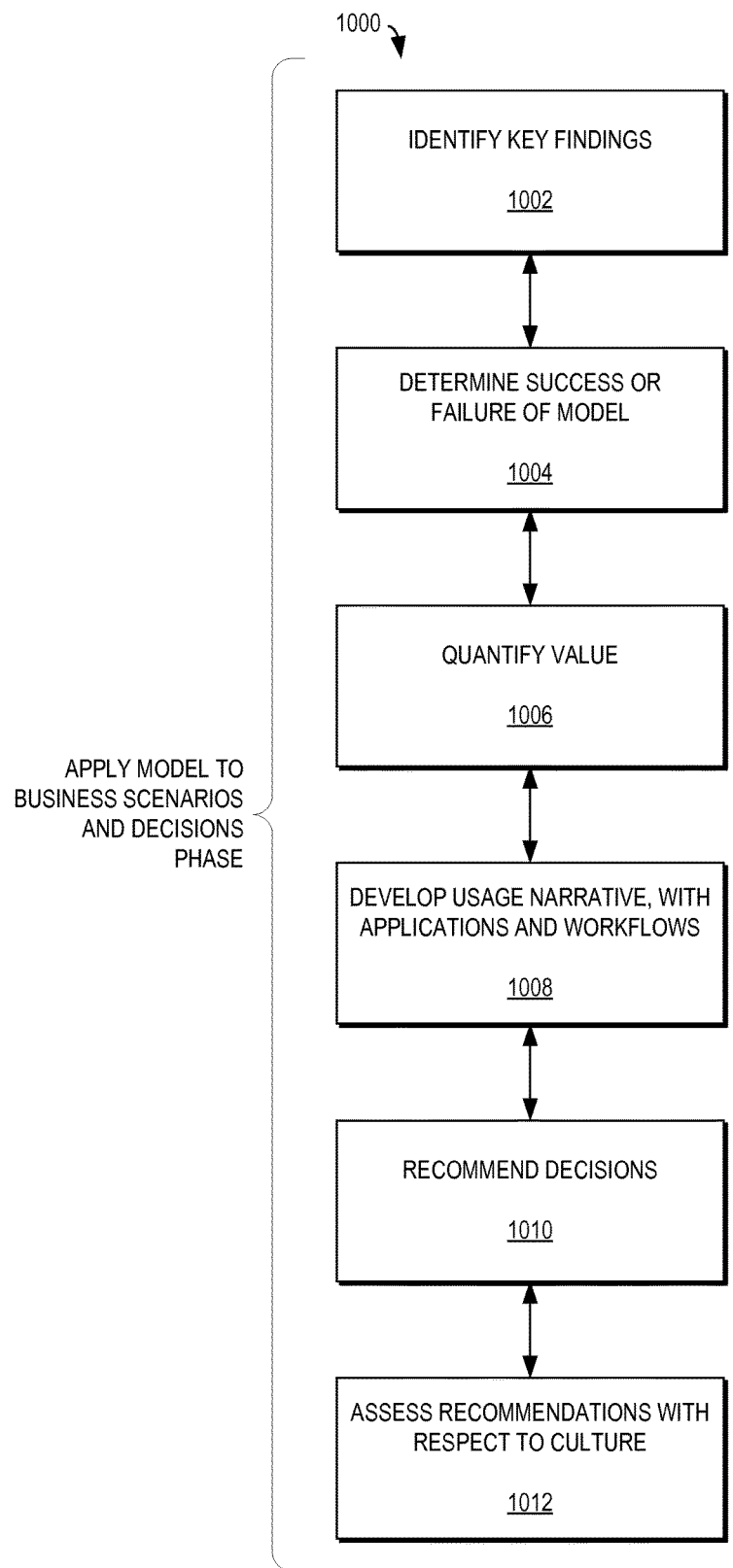
FIG. 10 illustrates details of an apply model to business scenarios and decisions phase of a holistic analytic lifecycle, in accordance with one embodiment of the invention.

FIG. 10 illustrates details of the apply model to analytic scenarios and decisions phase 412 of a holistic analytic lifecycle 400.

Step 1002: Identify key findings: The data scientist or business user may assess the results of the models, determine what was observed in the data as a result of the analytics, and as a result of this phase, document the key findings and major insights.

Step 1004: Determine success or failure of model. This phase of the lifecycle deals with the idea that, now that the system has executed the model, the system needs to go back and compare the outcomes to criteria for success and failure.

Step 1006: Quantify value. The data scientist or business user may interpret the results, compare to the initial hypotheses, and quantify (measure) the value (e.g., business value). The implications of the model output can be measured in terms of dollar value, time saved, or uncertainty reduced when making important decisions.

Step 1008: Develop usage narrative, with applications and workflows. What will be the usage narrative of the model? How will it be used in an enterprise application? For example, the results can be integrated into work processes or customer navigation of corporate websites.

Step 1010: Recommend decisions. Then recommendations may be presented, such as to a business during an approval process. A pilot project then may be run to determine whether the models need to be retrained and whether the instrumented model tends to solve the analytic problem according to the success factors. For example, a data scientist or business user may consider how best to articulate the findings and outcome to the various team members and stakeholders.

Step 1012: Assess recommendations with respect to culture. The recommendations may be assessed with respect to business culture (e.g., What kind of enterprise are we in? Do we make recommendations to customers? Are we the type of company that is willing to go out on the limb and tantalize customers with buying trends of other customers?) The data scientist or business user should make sure to consider and include caveats, assumptions, and any limitations of results. Because a presentation may be circulated within an organization, one should be thoughtful of how to convey the findings and clearly articulate the outcomes. One should make recommendations for future work or improvements to existing processes, and consider what each of the team members and stakeholders needs in order to fulfill their responsibilities.

Consider the following example within an organization. Sponsors have to champion their project, stakeholders have to understand how the model affects their processes (for instance, if it's a churn model, marketing has to understand how to use the churn model predictions in planning their interventions), and production engineers need to operationalize the work that has been done. In addition, this is the phase where one can underscore the business benefits of the work, and begin making the case to eventually put the logic into a live production environment.

Accordingly, now that model has been executed, one can do the following:

(1) Assess the results of the models:
   i. Are the results statistically significant and valid? If so, which aspects of the results stand out? If not, what adjustments need to be made to refine and iterate on the model to make it valid?
   ii. Which data points are surprising, and which were in line with the incoming hypotheses developed in the first phase? It is realized that comparing the actual results to the ideas formulated early on typically produces additional ideas and insights that would have been missed if one did not take time to formulate initial hypotheses early in the process.
(2) What is observed in the data as a result of the analytics?
   i. Of these, what are the most significant findings?
   ii. What is the business value and significance of these findings? Depending on what emerged as a result of the model, one may need to spend time quantifying the business impact of the results to help prepare for the presentation.

"Wrap and Operationalize Model" Phase 414 (Performed by Operationalizing Module 414 in System 300)

Operationalizing refers to the process of actually provisioning computing resources (physical and/or virtualized) to host the system that will be deployed to handle the analytics project in accordance with the final analytic plan (e.g., system 320 in FIG. 3). This may involve provisioning VMs and LUNs as well as other virtual and physical assets that are part of cloud infrastructure 110 in FIG. 1. The provisioned system will then analyze subsequent data that is obtained for the given complex data problem.

Figure 11:
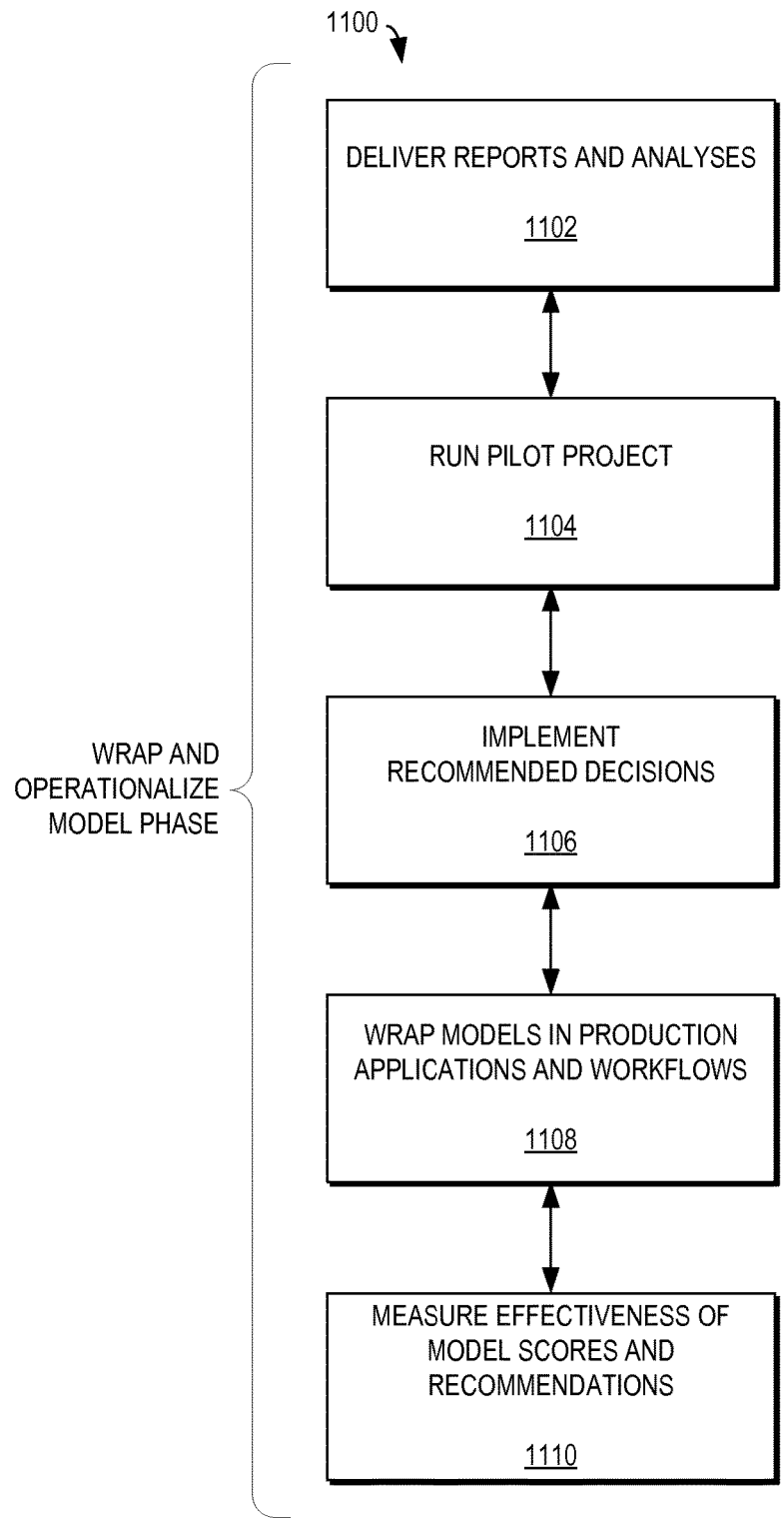
FIG. 11 illustrates details of a wrap and operationalize model phase of a holistic analytic lifecycle, in accordance with one embodiment of the invention.

FIG. 11 illustrates details of the operationalizing phase 414 of a holistic analytic lifecycle 400.

Step 1102: Deliver reports and analyses. The data scientist or business user, in conjunction with the model application module 312 of system 300, will have documented the key findings and major insights as a result of the analysis. The deliverable as a result of this phase will be the most visible portion of the process to the outside stakeholders and sponsors, so one should take care to clearly articulate the results, methodology, and business value of the holistic analytic lifecycle's findings.

In the context of the bank loan example, in this step, the final reports and presentations may be shared with project sponsors and other groups within the bank to compare it to their traditional decision methods for loans, in terms of the KPIs established early in the project. In addition, a change management approach would need to be developed to ensure this new application can be deployed and it is integrated into the day-to-day processes currently in place within the bank.

Step 1104: Run pilot project. A pilot program typically serves as a last or nearly final test of suitability and effectiveness of an analytical project prior to executing the model in a full-scale, live production environment. In step 1104, the model can be retrained as necessary or desired. For instance, this step is where users tune and recalibrate the model over time. This kind of tuning can be done in an automated way, or with human intervention. More specifically, the pilot program may be set up so one can deploy the work in a controlled way before broadening the work to a full enterprise or ecosystem of users.

In the context of the bank loan example, a pilot project can be run in production, on specific kinds of loans (may be only certain loan products at first, not all of them) or only in specific geographies (a particular state in the U.S., instead of a whole country or region). This enables the constituents to test the new application, learn and make adjustments to it.

Step 1106: Implement recommended decisions. In the model building phase, the system scored the model, and now in the operationalizing phase, this is the first time that most analytics approach deploy the new analytical methods or models in a production environment. Rather than deploying this on a wide scale basis, it is recommended that one do a small scope, pilot deployment first. Taking this approach will allow one to limit the amount of risk relative to a full, enterprise deployment and learn about the performance and related constraints on a small scale and make fine tune adjustments before a full deployment.

Step 1108: Wrap models in production applications and workflows. As one considers this effort, consider running the model in a product environment for a discrete set of single products, or a single line of business, which will test the model in a live setting. This will allow one to learn from the deployment, and make any needed adjustments before launching across the enterprise. Keep in mind that this phase can bring in a new set of team members—namely those engineers who are responsible for the production environment, who have a new set of issues and concerns. They want to ensure that running the model fits smoothly into the production environment and the model can be integrated into downstream processes.

Step 1110: Measure effectiveness of model scores and recommendations. While executing the model in the production environment, look to detect anomalies on inputs before they are fed to the model. Assess run times and gauge competition for resources with other processes in the production environment. After deploying the model, conduct follow up reviews to reevaluate the model after it has been in production for a period of time. Assess whether the model is meeting goals and expectations, and if desired changes (such as increase in revenue, reduction in churn) are actually occurring. If these outcomes are not occurring, determine if this is due to a model inaccuracy, or if its predictions are not being acted on appropriately. If needed or desired, automate the retraining/updating of the model. In any case, ongoing monitoring of model accuracy will be needed, and if accuracy degrades, the model will need to be retrained. If feasible, one should design alerts for when the model is operating "out-of-bounds." This includes situations when the inputs are far beyond the range that the model was trained on, which will cause the outputs of the model to be inaccurate. If this begins to happen regularly, retraining is called for.

Many times analytical projects yield new insights about a business, a problem, or an idea that people may have taken at face value or thought was impossible to dig into. If appropriate, hold a meeting with the analytic team to discuss what about the process or project one would change if the project were to be done again from the beginning. It may be a good idea to restart modeling from an earlier phase in the lifecycle.

Given the detailed description of the holistic analytic lifecycle phases above, we now make some observations and introduce some other features and advantages of the system.

Assume that the data scientist 301 is at a later phase in the process but then realizes that he/she forgot to include some data in the discovery phase 404 that is needed to complete the analysis. Advantageously, the interrelated and iterative nature of the holistic analytic lifecycle 400 and the flexibility of the system used to automate the holistic analytic lifecycle (system 300) provide the data scientist with the ability to return to the discovery phase, correct the error, and return to a subsequent stage with the results for each stage affected by the change being automatically updated.

During the model building phase 410, it is not known what resources are going to be needed, which have a specific cost, and definition of what would be included (amount of storage, number of VMs, the analytics tools needed, etc.). Being able to know the approximate cost and configuration needed would be very useful for the process of tuning the model based on cost or configuration constraints. Thus, during each phase of the holistic analytic lifecycle 400, the data scientist 301 may be presented (at GUI 301) with an inventory of the current infrastructure, services, and tools needed and their approximate cost as changes are made to the parameters associated with the analysis. This allows the data scientist to remove or change the model dynamically based on resource constraints (e.g., cost or VM limits).

Once the analytic model 316 is defined, provisioning the resources needed to most efficiently support the analysis is important. As such, embodiments of the invention automate and execute analytic models for the data scientist by constructing the analytic model and providing resource and cost estimates throughout the holistic analytic lifecycle.

It is also realized that privacy of data is a major concern when mining large amounts or correlating various types of data. Privacy of the individuals needs to be protected while still allowing useful analysis and presentation of the data. Embodiments of the invention provide for masking capabilities in the analytic model 316, as well as any data presented by the system, for the data scientist, as well as creating contextual views based on the identity of the consumer of the output. This feature is very useful, particularly in a highly regulated data environment.

Further, the privacy/masking techniques associated with the analytic model 316 and other data can be employed to protect the data from wholesale viewing by the data scientist or an output generated by the analytic model execution. Also it is possible to create multiple views of the data based on privacy constraints tied to the context and role of the potential viewer. For example, a mid-level sales manager may have the ability to see consolidated data across the sales areas in the country, but his/her subordinates within the same area would only be allowed to see that specific area's data view as they are not authorized to see data across the country for regulatory (e.g., Securities and Exchange Commission) reasons.

As a consequence of the privacy aspect, the data scientist can receive a diagnostic summary stating the resources they have access to for the analytical work they are planning to pursue.

While some illustrative privacy/masking techniques have been described above, it is to be understood that alternative privacy protection controls (such as, but not limited to, privacy anonymization) can be employed in system 300.

In addition, the operationalizing module 314 can make predictions of the types of additional technology resources and tools needed to complete the analytics, based on the type of analytics being undertaken. As a result, the data scientist would be notified early if they needed to request additional tools that would enable them to complete their work. This aspect of system 300 enables the data scientist to initiate funding requests earlier in the holistic analytic lifecycle, identify people if specific skill sets are needed (such as a Hadoop® expert in addition to a mathematician), and operationalize the resources before the data modeling stages (e.g., identify this during phase 404 of the holistic analytic lifecycle, rather than in phase 410) to avoid bottlenecks in the project.

It is further realized that an analytic model containing a larger sized data set will contribute to an increased cost, as provisioning will increase. Besides size, other data set characteristics may impact cost, e.g., perhaps publicly available data is cheaper than sensitive data, which requires an anonymization service. System 300 gives the data scientist insight into which data set characteristics would be most beneficial to the analytic plan.

Further, it is realized that the work of all data scientists is not equal. For example, a critical project such as one directed by an officer of the company (e.g., CEO) could require higher priority and take precedence over existing analytic models. Also, perhaps the CEO's analytic model should be executed faster than regular data scientists, thus increasing provisioning. System 300 accounts for the priority levels associated with the data scientists.

Advantageously, system 300 allows a data scientist to know ahead of execution time the execution costs. Additionally, the system is able to dynamically change system parameters as the data scientist begins to refine the data and the analysis without having to start all over again or manually de-provision or increase the provisioned resources. System 300 creates a dynamic analytic model that includes the parameters needed to move through the holistic analytic lifecycle and include the automation necessary to allow the data scientist to focus on fine tuning the parameters and not on manually changing the infrastructure or data ingest process.

Figure 12:
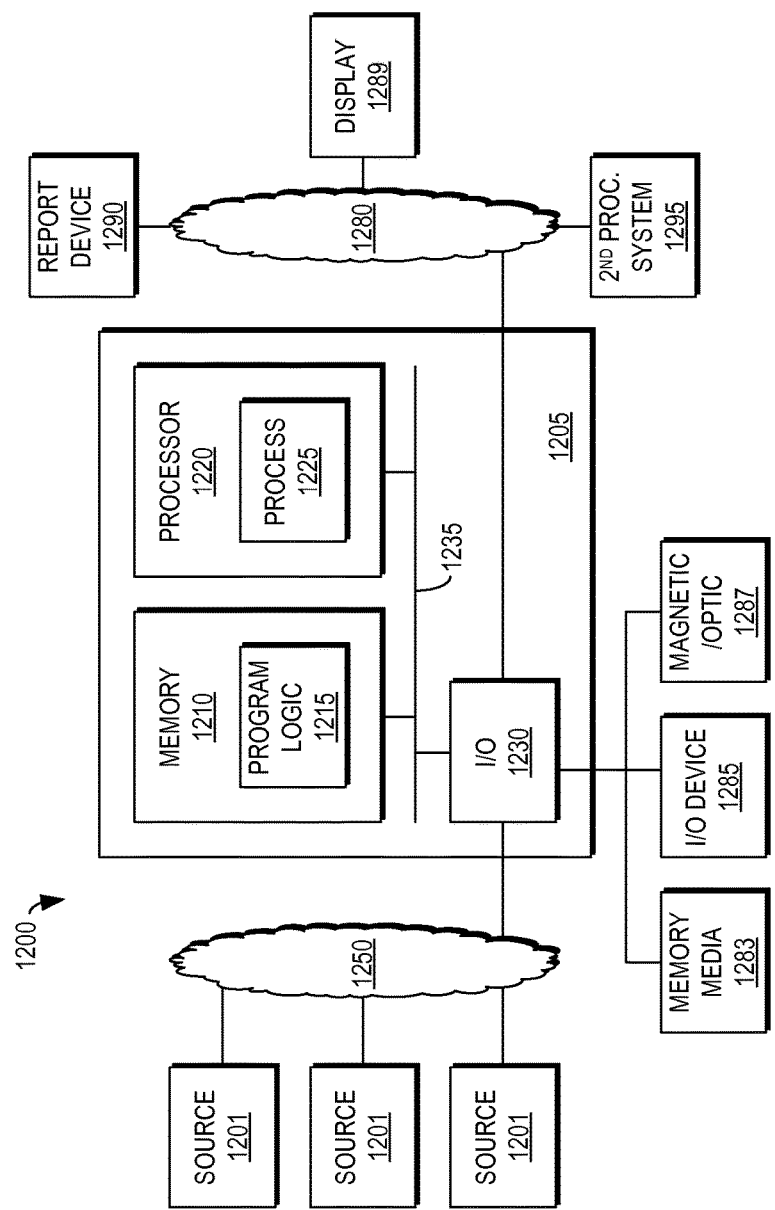
FIG. 12 is a block diagram illustrating an apparatus according to an example embodiment of the present invention.

FIG. 12 is a block diagram of an example embodiment apparatus 1205 according to the present invention. The apparatus 1205 may be part of a system 1200 and includes memory 1210 storing program logic 1215, a processor 1220 for executing a process 1225, and a communications I/O interface 1230, connected via a bus 1235.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 12, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine.

Figure 13:
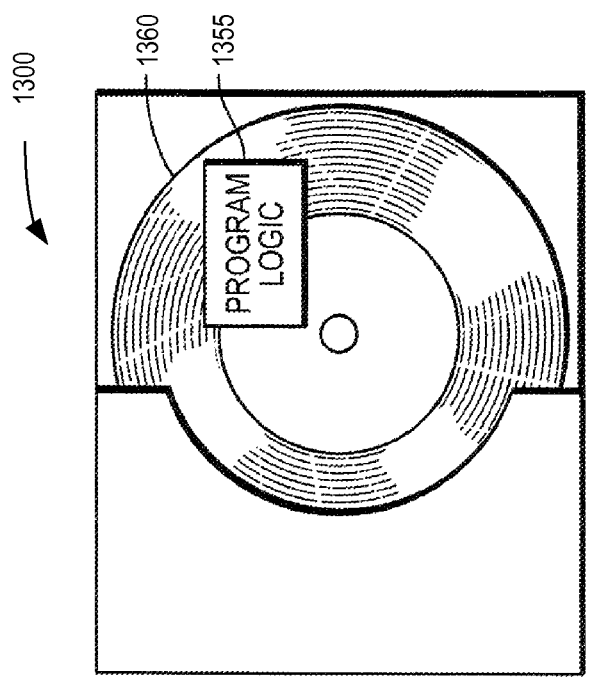
FIG. 13 is an illustration of an apparatus as embodied in program code according to an example embodiment of the present invention.

FIG. 13 shows program logic 1355 embodied on a computer-readable medium 1360 as shown, and wherein the logic 1355 is encoded in computer-executable code configured for carrying out the gas controlling process of this invention, thereby forming a computer program product 1300.

The logic for carrying out the method may be embodied as part of the aforementioned system, which is useful for carrying out a method described with reference to embodiments shown in, for example, FIGS. 1-11. For purposes of illustrating the present invention, the invention is described as embodied in a specific configuration and using special logical arrangements, but one skilled in the art will appreciate that the device is not limited to the specific configuration but rather only by the claims included with this specification.

Embodiments of the present invention have been described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

Further, as used herein, the term "provisioning" refers to the process(es) of generating and deploying one or more computing resources in a computing system, such as for example, in a cloud infrastructure environment, generating and deploying one or more virtual machines in a data center.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A method for performing big data analytics in a holistic analytic lifecycle and provisioning computing system comprising:
    defining a holistic context of an analytics lifecycle for an analytic problem;
    determining one or more data sets for solving the analytic problem according to the analytics lifecycle under the holistic context;
    conditioning at least a portion of original data in the one or more data sets to generate conditioned data;
    selecting a model to analyze at least one of the original data and the conditioned data;
    executing the selected model on at least one of a portion of the original data and a portion of the conditioned data to confirm an adequacy of the selected model;
    communicating results of execution of the selected model to at least one entity; and
    provisioning one or more computing resources to implement the selected model;
    providing a graphical user interface configured:
        to present a current allocation of computing resources for implementing the selected model;
        to present an estimated cost associated with the current allocation of computing resources; and
        to provide a user interface feature for dynamically adjusting one or more parameters of the selected model in each of a plurality of phases of the holistic analytic lifecycle, wherein dynamically adjusting the one or more parameters of the selected model dynamically updates the current allocation of computing resources and the estimated cost presented via the graphical user interface;
    wherein the method is performed using at least one processing device comprising a processor coupled to a memory.

2. The method of claim 1 wherein defining a holistic context of a data analytics lifecycle for a given data problem comprises:
    determining a business context of the data analytics lifecycle associated with the analytic problem;
    determining attributes associated with the analytic problem; and
    determining success criteria associated with the analytic problem.

3. The method of claim 2 wherein determining one or more data sets for solving the analytic problem according to the analytics lifecycle under the holistic context comprises:
    discovering data sources including the one or more data sets;
    enhancing raw data of the one or more data sets with tags regarding data source attributes; and
    ingesting data from the data sources.

4. The method of claim 3 wherein determining one or more data sets for solving the analytic problem according to the analytics lifecycle under the holistic context further comprises:
    creating mappings among the one or more data sets according to the determined primary keys and indices; and
    merging the one or more data sets.

5. The method of claim 1 wherein conditioning at least a portion of original data in the one or more data sets to generate conditioned data comprises:
    extracting data from the one or more data sets;
    performing a transformation on the original data from the one or more data sets to generate conditioned data; and
    loading data from at least one of the original data and the conditioned data.

6. The method of claim 5 wherein:
    extracting data from the one or more data sets comprises filtering data from the one or more data sets; and
    loading data from at least one of the original data and the conditioned data comprises assessing quality of at least one of the original data and the conditioned data for solving the analytic problem.

7. The method of claim 5 wherein performing a transformation on the original data from the one or more data sets to generate conditioned data comprises:
    transforming the original data from the one or more data sets;
    integrating the original data from the one or more data sets; and enhancing the original data from the one or more data sets.

8. The method of claim 1 wherein selecting a model to analyze at least one of the original data and the conditioned data comprises:
determining model techniques; and
analyzing data to determine relationships among data variables.

9. The method of claim 8 wherein determining model techniques comprises selecting a model according to at least one of a modeling approach, a model type, a model category, and a model score.

10. The method of claim 8 wherein determining model techniques further comprises identifying potential applications to wrap the selected model for execution of the selected model.

11. The method of claim 8 wherein analyzing data to determine relationships among data variables comprises:
identifying correlations among data variables; and
determining key variables.

12. The method of claim 1 wherein executing the selected model on at least one of a portion of the original data and a portion of the conditioned data to confirm an adequacy of the selected model comprises:
importing appropriate data sets of the one or more data sets for modeling purposes;
challenging the selected model with related models to improve the choice of selected model; and
prototyping the selected model in a prototyping application.

13. The method of claim 12 wherein prototyping the selected model in a prototyping application comprises:
testing the selected model according to the imported appropriate data sets;
refining the selected model according to results of testing the selected model according to the imported appropriate data sets; and
wrapping the refined selected model in a prototyping application.

14. The method of claim 12 wherein:
defining a holistic context of an analytics lifecycle for an analytic problem comprises defining an initial analytic plan for analyzing the one or more data sets to solve the analytic problem; and
executing the selected model on at least one of a portion of the original data and a portion of the conditioned data to confirm an adequacy of the selected model comprises updating the initial data analytic plan to generate a refined data analytic plan.

15. The method of claim 12 wherein communicating results of execution of the selected model to at least one entity comprises:
determining key findings of results of the model execution; and
recommending decisions according to results of the model with respect to the analytic problem within the holistic context.

16. The method of claim 15 wherein determining key findings of results of the model execution comprises determining success or failure of the model.

17. The method of claim 15 wherein determining key findings of results of the model execution comprises:
identifying one or more of predictors, classifiers, and segments among the results of the model execution; and
generating rankings, estimates, and decisions according to the results of the model execution.

18. The method of claim 15 wherein recommending decisions according to results of the model with respect to the analytic problem within the holistic context comprises:
generating implementation recommendations, including wrapping applications;
quantifying value of implementing the implementation recommendations within the holistic context; and
assessing implementation recommendations with respect to holistic context.

19. The method of claim 18 wherein provisioning one or more computing resources to implement the selected model comprises:
implementing an implementation recommendation; and
providing the selected model for use in a data analysis application.

20. The method of claim 19 wherein implementing an implementation recommendation comprises:
studying reports and analyses of the implementation recommendation schemata; and
selecting an implementation recommendation to implement the recommended decisions.

21. The method of claim 19 wherein providing the selected model for use in a data analysis application comprises wrapping the selected model in the data analysis application for deployment according to a workflow.

22. The method of claim 21 further comprising:
deploying the selected model wrapped in the analysis application within the holistic context;
measuring an effectiveness of the selected model; and
recommending decisions according to results of the selected model with respect to the analytic problem within the holistic context.

23. A holistic analytic lifecycle and provisioning computing system for performing big data analytics comprising:
at least one processing device comprising a processor coupled to a memory;
the at least one processing device being configured:
to define a holistic context of an analytics lifecycle for an analytic problem;
to determine one or more data sets for solving the analytic problem according to the analytics lifecycle under the holistic context;
to condition at least a portion of original data in the one or more data sets to generate conditioned data;
to select a model to analyze at least one of the original data and the conditioned data;
to execute the selected model on at least one of a portion of the original data and a portion of the conditioned data to confirm an adequacy of the selected model;
to communicate results of execution of the selected model to at least one entity;
to provision one or more computing resources to implement the selected model; and
to provide a graphical user interface configured:
to present a current allocation of computing resources for implementing the selected model;
to present an estimated cost associated with the current allocation of computing resources; and
to provide a user interface feature for dynamically adjusting one or more parameters of the selected model in each of a plurality of phases of the holistic analytic lifecycle, wherein dynamically adjusting the one or more parameters of the selected model dynamically updates the current allocation of computing resources and the estimated cost presented via the graphical user interface.

24. A computer program product including a non-transitory computer-readable storage medium encoded with computer program code that, when executed on a processor of a computer, causes the computer to automate a data analytics lifecycle and provision the computer in accordance with the automated data analytics lifecycle, the computer program product comprising:

computer program code for defining a holistic context of an analytics lifecycle for an analytic problem;

computer program code for determining one or more data sets for solving the analytic problem according to the analytics lifecycle under the holistic context;

computer program code for conditioning at least a portion of original data in the one or more data sets to generate conditioned data;

computer program code for selecting a model to analyze at least one of the original data and the conditioned data;

computer program code for executing the selected model on at least one of a portion of the original data and a portion of the conditioned data to confirm an adequacy of the selected model;

computer program code for communicating results of execution of the selected model to at least one entity;

computer program code for provisioning one or more computing resources to implement the selected model; and computer program code for providing a graphical user interface configured:

to present a current allocation of computing resources for implementing the selected model;

to present an estimated cost associated with the current allocation of computing resources; and to provide a user interface feature for dynamically adjusting one or more parameters of the selected model in each of a plurality of phases of the holistic analytic lifecycle, wherein dynamically adjusting the one or more parameters of the selected model dynamically updates the current allocation of computing resources and the estimated cost presented via the graphical user interface.

\* \* \* \* \*